3,180,895
FLUOROCARBON ETHERS

John Ferguson Harris, Jr., Wilmington, Del., and Donald Irwin McCane, Marietta, Ohio, assignors to E. I. du Pont de Nemours and Company, Wilmington, Del., a corporation of Delaware
No Drawing. Filed Nov. 25, 1960, Ser. No. 71,393
5 Claims. (Cl. 260—614)

The present invention relates to novel perfluorinated ethers, and, particularly, to novel perfluorinated vinyl ethers.

Partially fluorinated vinyl ethers have been made heretofore by a reaction involving an alkali metal alkoxide and a fluorinated ethylene. For example, trifluorovinyl ethers are prepared by the following reaction $$RONa + CF_2=CF_2 \rightarrow R-OCF_2=CF_2 + NaF$$

All of the known reactions for the preparation of halogenated vinyl ethers involve the use of an alcohol. The preparation of a completely fluorinated vinyl ether by these prior art methods would, therefore, require a completely fluorinated alcohol. It has, however, been established and is well known, see for example pages 137 of the ACS Monograph, "Aliphatic Fluorine Compounds" by Lovelace et al., published in 1958, that completely fluorinated primary alcohols are inherently unstable and can not be isolated. Hence, it is apparent that the prior art techniques for the preparation of trifluorovinyl ethers are not suitable for the preparation of perfluorinated vinyl ethers.

It is, therefore, the principal object of the present invention to provide such novel perfluorinated vinyl ethers.

The perfluorinated vinyl ethers of the present invention have the following structure $$R_f-O-CF=CF_2$$

where $R_f$ is a perfluorocarbon radical, i.e., a radical consisting of molecular arrangements of fluorine and carbon. The perfluorocarbon radical may be aliphatic or aromatic in nature. The more reactive perfluorovinyl ethers comprise those containing from 1 to 12 carbon atoms in the perfluorocarbon radical.

The perfluorinated ethers are prepared by the pyrolysis of perfluorinated 2-alkoxypropionic acid or derivatives thereof. This acid has the following structure $$CF_3-CF-COOH$$
$$|$$
$$O-R_f$$

where $R_f$ has the same meaning as above. In a preferred method, the vinyl ether of the present invention is prepared by pyrolysis of the alkali metal salt of the perfluoro-2-alkoxypropionic acid. However, it is also feasible to pyrolyze the acid fluoride or the acid itself to recover the perfluorinated vinyl ether. The pyrolysis of the alkali metal salt of the perfluoro-2-alkoxypropionic acid is carried out in a temperature range of 100 to 250° C. If the dry salt is used by itself, the temperature is maintained at 170 to 250° C. In the presence of polar solvents, such as ethylene glycol dimethyl ether and benzonitrile, the decomposition is generally carried out at temperatures of 100° C. to 180° C. Non-polar solvents, such as diphenyl, can also be used to assist in heat transfer. The reaction gives a very high yield, greater than 95%, when carried out under proper conditions.

The necessary starting material for the synthesis of the perfluoroalkyl perfluorovinyl ethers, i.e., the perfluoro-2-alkoxypropionic acid or derivatives thereof can be prepared by various techniques. Thus, the acid may be prepared from the corresponding hydrocarbon acid by electrolysis with hydrogen fluoride. This technique of preparing fluorocarbon compounds is well-established in the art. In a preferred method, however, the acid is prepared by the reaction of a perfluorinated acid fluoride with hexafluoropropylene epoxide. The reaction is carried out in bulk in the presence of a catalyst such as activated carbon or in a polar solvent with no highly active hydrogen, such as acetonitrile, benzonitrile, ethylene glycol dimethyl ether, diethylene glycol dimethyl ether, n-methyl pyrrolidone, dimethyl sulfoxide, etc. The reaction is catalyzed by alkali metal fluorides, silver fluoride, quaternary ammonium fluorides and similar compounds. The reaction is carried out at temperatures from —80 to 200° C. For example, perfluoro-2-methoxypropionyl fluoride is prepared by a method which comprises charging 30 g. of cesium fluoride and 75 ml. of diethylene glycol dimethyl ether into a 320 cc. stainless steel autoclave, cooling the vessel to —80° C., and after evacuation charging 66 g. of carbonyl fluoride and 83 g. of hexafluoropropylene epoxide into the autoclave, and thereafter heating the reaction vessel to 75° C. for 4 hrs. Low temperature distillation of the resulting product affords 3 g. of hexafluoropropylene epoxide and 82 g. of perfluoro-2-methoxypropionyl fluoride, B.P. 10–12° C. The fluoride is readily converted to the acid by hydrolysis and to the alkali metal salt by reaction of the acid or the acid fluoride with an alkali metal hydroxide.

Perfluoro-2-alkoxypropionic acids suitable in the formation of the novel vinyl ethers of the present invention include perfluoro-2-methoxypropionic acid, perfluoro-2-ethoxypropionic acid, perfluoro-2-propoxypropionic acid, perfluoro-2-butoxypropionic acid, perfluoro-2-isobutoxypropionic acid, perfluoro-2-(β-ethylpropoxy)propionic acid, perfluoro-2-(cyclobutylmethoxy)propionic acid, perfluoro-2-heptoxypropionic acid, perfluoro-2-dodecoxypropionic acid, etc.

The preparation of the novel perfluorovinyl ethers of the present invention is further illustrated by the following examples.

Example I

Perfluoro-2-methoxypropionyl fluoride, 8 g., was dehalocarbonylated by passage through a bed of dry potassium sulfate pellets at 300° C. for a contact time of 10 min. The product obtained was 60% perfluoromethyl perfluorovinyl ether, B.P. —22° C. Infrared and nuclear magnetic resonance spectra were consistent with the structure assigned.

Example II

A reaction vessel consisting of a polyethylene bottle with a "Dry Ice" condenser attached, was charged with 201 g. of perfluoro-2-methoxypropionyl fluoride. There was then added 30 g. of water. The reaction mixture was neutralized to a phenolphthalein end point with 10 N KOH in water and was then evaporated to dryness at 25° C. The dry mixture of potassium perfluoro-2-methoxypropionate and potassium fluoride was further dried in vacuo at 100° C. A glass reaction vessel attached to a "Dry Ice"-cooled trap was charged with this salt mixture. It was heated to 185–215° C. for 24 hrs. Distillation of the condensate in the "Dry Ice" trap afforded 115 g. (80%) of perfluoromethyl perfluorovinyl ether.

Example III

Employing the procedure of Example II, perfluoro-2-propoxypropionyl fluoride was converted to the potassium salt and then pyrolyzed. A 79% yield of perfluoropropyl perfluorovinyl ether was obtained. The vinyl ether has a B.P. at 35 to 36° C. Nuclear magnetic resonance and infrared spectra of the product were consistent with the assigned structure.

Example IV

Using the procedure of Example II, perfluorooctyl perfluorovinyl ether is prepared from perfluoro-2-octoxypropionyl fluoride.

*Example V*

Using the procedure of Example II, perfluoroisobutyl perfluorovinyl ether is prepared from perfluoro-2-isobutoxypropionyl fluoride.

The principal utility of the vinyl ethers of the present invention results from their ability to be polymerized. Thus, the vinyl ethers of the present invention are capable of homopolymerization as well as copolymerization with other ethylenically unsaturated monomers, in particular tetrafluoroethylene. The polymerization of the perfluorinated vinyl ethers may be carried out, for example, by the procedure described in U.S. 2,952,669, issued September 13, 1959 to M. I. Bro. The polymerization of the perfluorovinyl ethers of the present invention is also described in copending application Serial No. 618,435, filed October 26, 1956, of which this application is a continuation-in-part.

The following experiment shows the preparation of polymers employing the perfluorinated vinyl ethers of the present invention.

A 100 ml. stainless steel autoclave fitted with a magnetically driven stirring blade was flushed with nitrogen and evacuated. A solution of 10 g. (0.06 mol) of perfluoromethyl perfluorovinyl ether in 64 ml. of perfluorodimethylcyclobutane was admitted to the autoclave. The solution was heated to 60° C. and then tetrafluoroethylene was pressured into the autoclave until a pressure of 300 p.s.i.g. was attained. Approximately $10^{-4}$ mol of $N_2F_2$ diluted with $N_2$ was added to the rapidly stirred mixture. The contents of the autoclave were heated with stirring for 45 minutes at 60° C., and then cooled to room temperature and vented to atmospheric pressure. Solid polymer, weighing 11.4 g., was obtained. The melt viscosity of the copolymer at 380° C. was $16 \times 10^4$ poises. Infrared analysis of films of the resin pressed at 250° C. and 25,000 pounds platen pressure indicated that the copolymer contained 11.3 wt. percent perfluoromethyl perfluorovinyl ether. The films of the copolymer were tough, transparent and colorless.

We claim:
1. A perfluorovinyl ether having the structure

$$R_f\text{—}O\text{—}CF=CF_2$$

wherein $R_f$ is a perfluoroalkyl radical having 1 to 12 carbon atoms.

2. Perfluoromethyl perfluorovinyl ether.
3. Perfluoropropyl perfluorovinyl ether.
4. Perfluorooctyl perfluorovinyl ether.
5. Perfluoroisobutyl perfluorovinyl ether.

References Cited by the Examiner
UNITED STATES PATENTS
2,917,548  12/59  Dixon _____ 260—614

LEON ZITVER, *Primary Examiner.*
CHARLES B. PARKER, *Examiner.*